Dec. 2, 1947.  C. A. WIKEN ET AL  2,432,058
MACHINE TOOL
Filed July 30, 1943   6 Sheets-Sheet 1
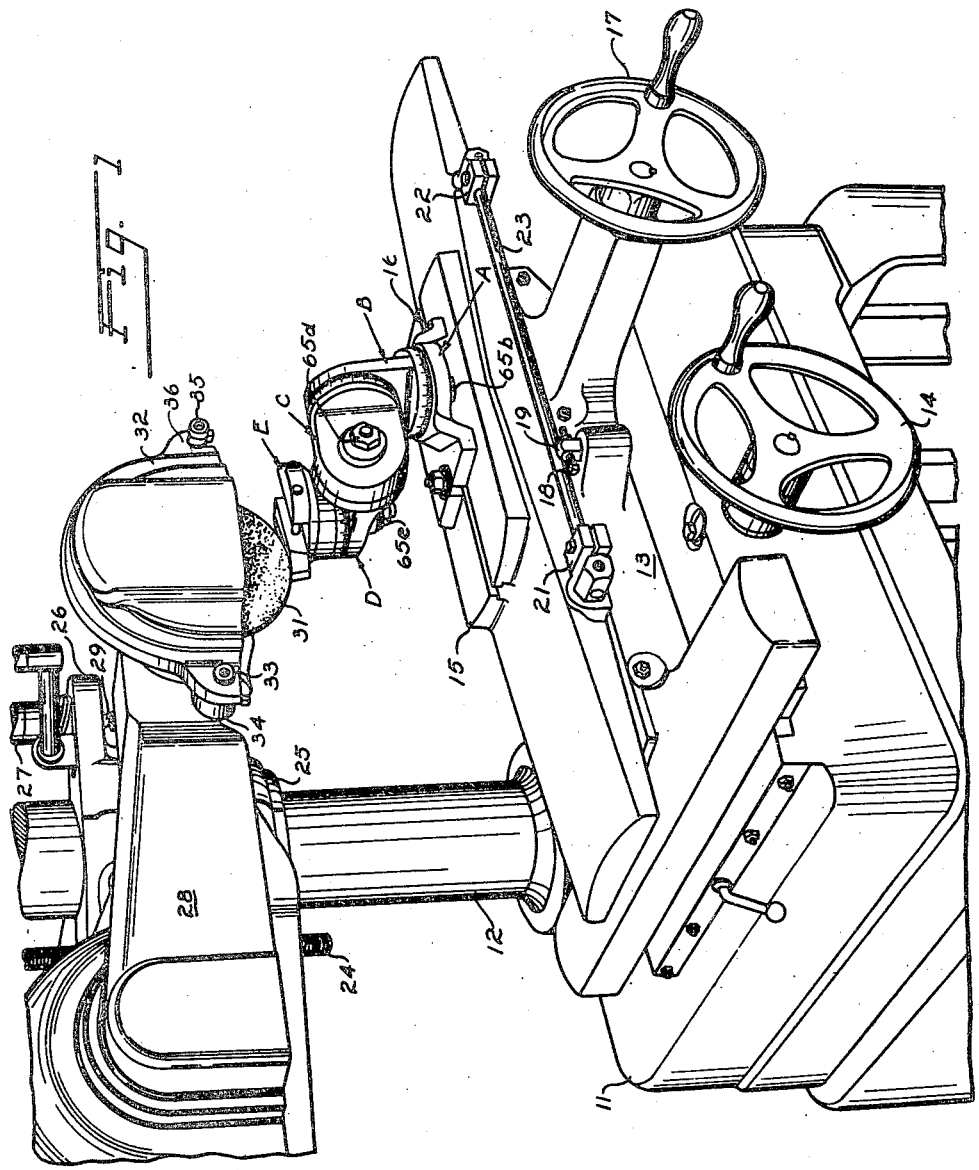
Inventors
CHRISTY A. WIKEN
ERIC A. REIBIG
By  Strauch & Hoffman
Attorneys

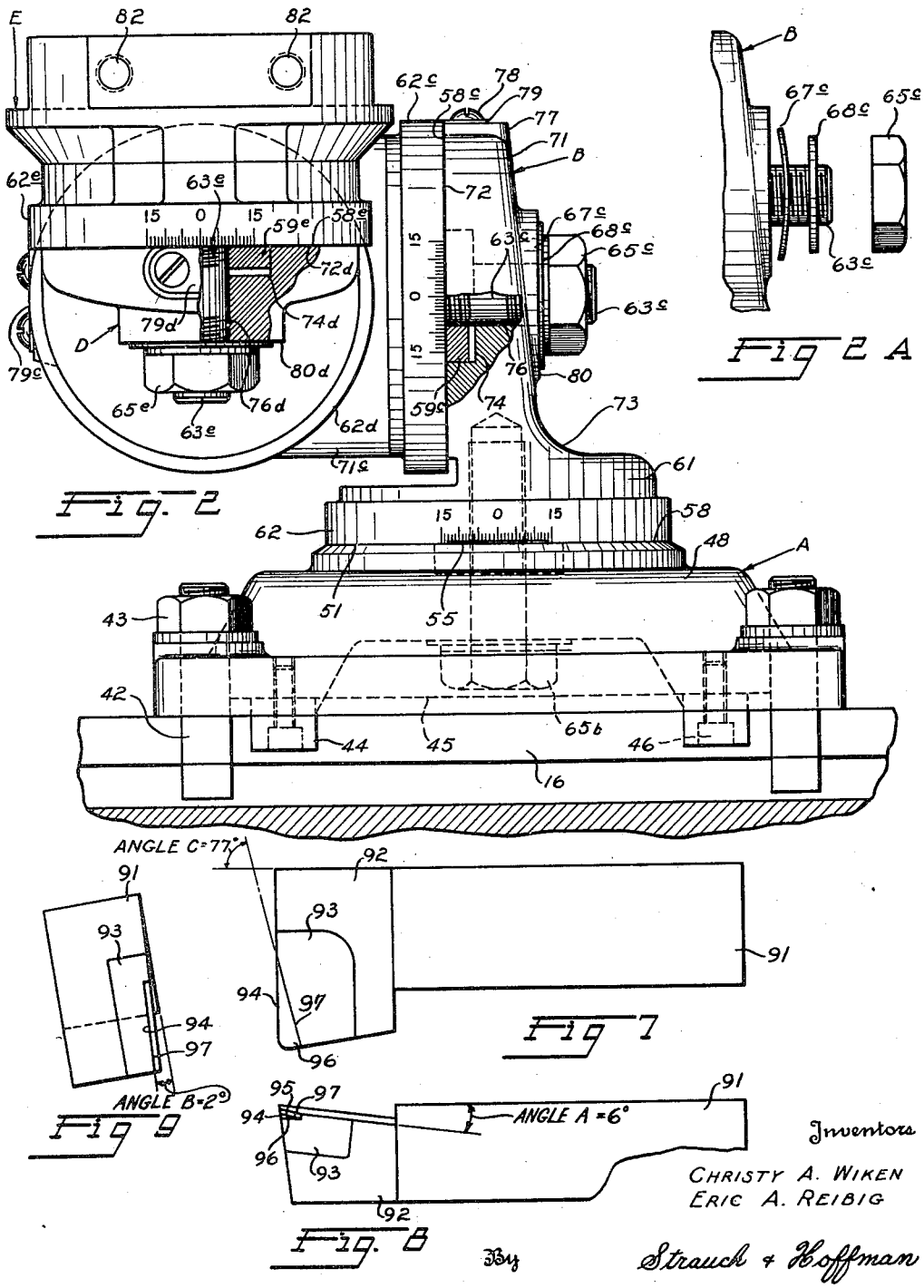

Inventors
CHRISTY A. WIKEN
ERIC A. REIBIG
By Strauch & Hoffman
Attorneys

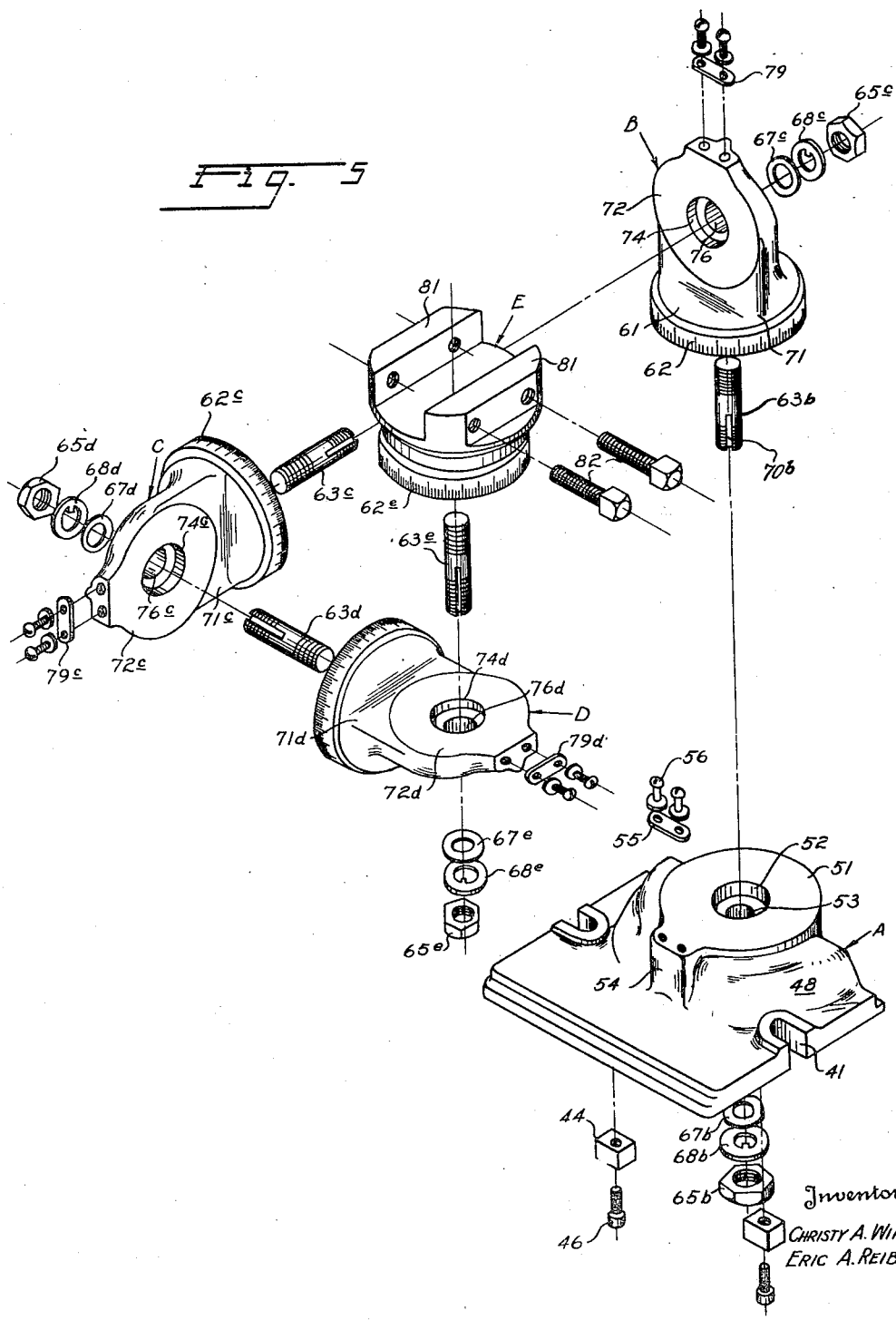

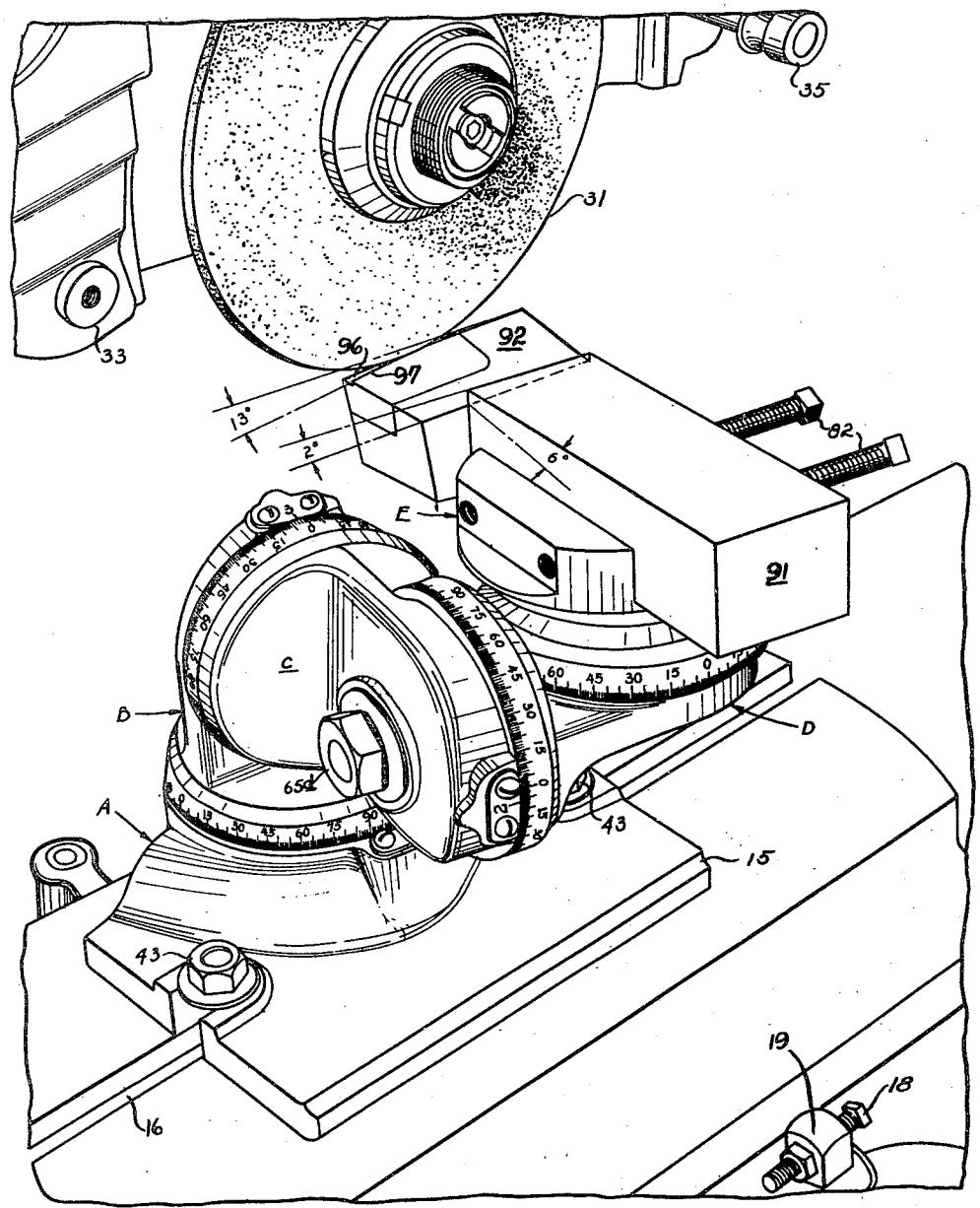

Dec. 2, 1947.   C. A. WIKEN ET AL   2,432,058
MACHINE TOOL
Filed July 30, 1943   6 Sheets-Sheet 6
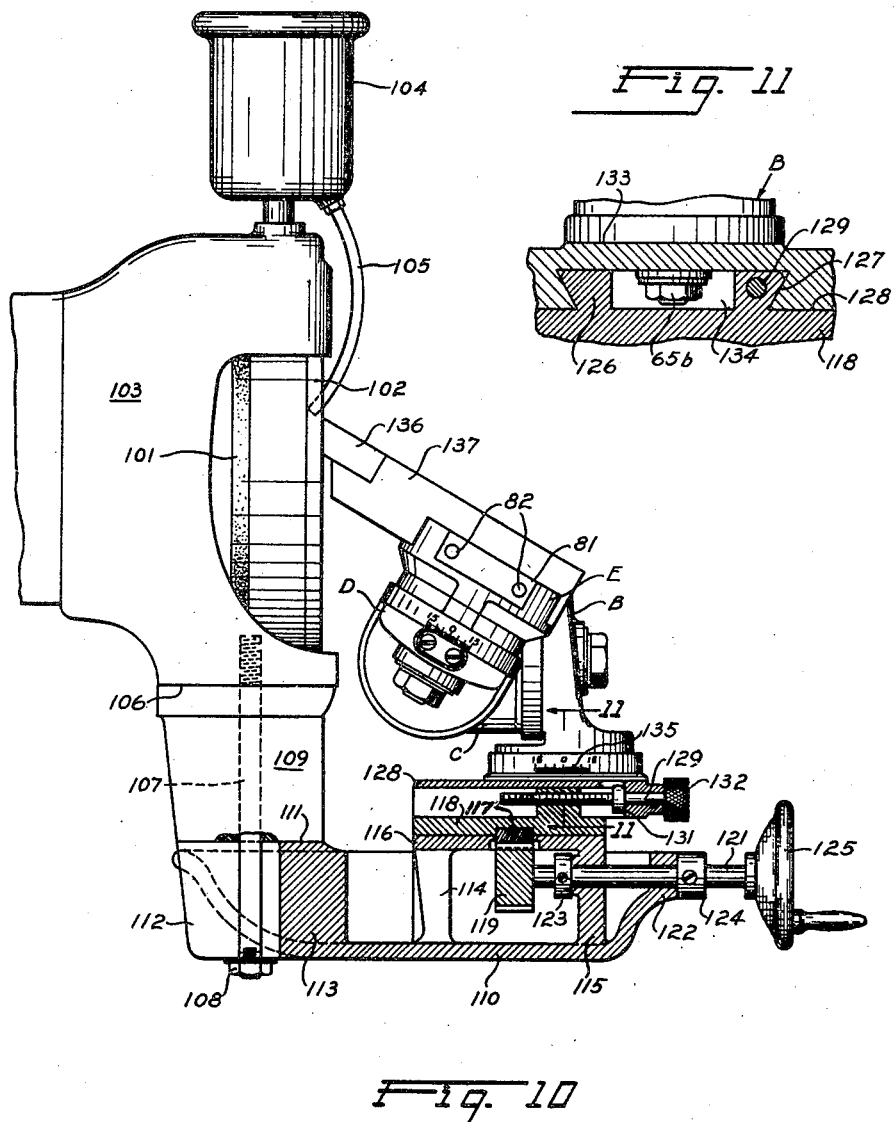
Inventor
CHRISTY A. WIKEN
ERIC A. REIBIG
By   Strauch & Hoffman
Attorneys Patented Dec. 2, 1947

2,432,058

UNITED STATES PATENT OFFICE 2,432,058

MACHINE TOOL

Christy A. Wiken and Eric A. Reibig, Milwaukee, Wis., assignors, by mesne assignments, to Rockwell Manufacturing Company, Pittsburgh, Pa., a corporation of Pennsylvania Application July 30, 1943, Serial No. 496,788

10 Claims. (Cl. 51—224)

1

The present invention relates to machine tools and is more particularly concerned with machines having an adjustably mounted vise or work gripping device mounted for reciprocation and adapted to carry a work piece back and forth with respect to a grinding wheel, although it is not limited to such use, as it may be advantageously employed to present work pieces to other types of metal working.

Although machines of this general character have been heretofore proposed, and some of them have gone into use, many of them are open to the objections that they are special or "single purpose" machines, with the work gripping device and adjustable mounting built into the machine as permanent parts, with the result that it is impossible to remove the work gripping device and its adjustable mount and utilize the machine to carry out other grinding operations of a more general nature, for instance surface grinding of large work pieces and the like. In the machines of the prior art it is in many instances impossible to set up a work piece embodying compound angles by individually adjusting each of the elements making up the adjustable mount for the work gripping device, directly to all components of the angle, with the result that compensation tables must be worked out and supplied each user of such machines, and must be carefully followed or spoiled work will result.

The machines of the prior art are also of complicated, costly construction and do not support the work piece with sufficient rigidity to insure the carrying out of accurate grinding operations.

It is accordingly the major object of this invention to provide a machine tool having a reciprocable table, with a work gripping device which is readily installed upon and secured to the table, will accurately hold a tool or other work piece in any one of a plurality of angular adjusted positions, embodies an adjustably mounted vise for presenting the work to the wheel in such manner that a surface disposed at any compound angle with respect to the tool may be readily brought into parallelism with the work table and ground, and yet the vise and its mount may be readily removed from the table when desired and other classes of work clamped directly to the work table and reciprocated so as to grind surfaces parallel to the grinding plane of the wheel, as well as carry out other grinding operations.

Another object is to provide a work holding vise with a universally adjustable mounting assembly made up of a plurality of pivotally interconnected swivel members of identical shape and

2 size, whereby they may be freely interchanged and assembled in different combinations to provide the degree of adjustability desired.

A further object is to provide a vise and a base and a plurality of pivotally connected, interchangeable swivel members supporting the vise on the base in any desired angular adjusted position, the parts being so designed that the swivel members may be removed and the vise mounted directly upon the base for adjustment about a vertical axis.

Another object is to provide a novel tool holding assembly adapted to be detachably clamped to the work table of a surface grinder and embodying a vise for holding a chip breaker tool or the like and an adjustable mounting assembly operable to support the vise in any desired angular adjusted position to grind a chip breaker groove in the tool, the parts being so designed as to permit the device to be directly set up from the specification of the angles which locate the plane of the surface to be ground.

The invention further aims to provide novel swivel members for adjustably mounting a vise on a base, each of which is pivotally connected to its neighbor in such manner that a rigid, strong connection, which will not yield under the pressures set up during grinding, is provided; novel pressure assemblies for resiliently holding the parts together with a predetermined degree of frictional "drag" when they are being adjusted relatively to each other; novel means for indicating the degree of angular adjustment of the swivel members with respect to each other and to the vise and base; a novel vise or clamp device embodying a pair of stationary jaws and clamp means adapted to cooperate with either jaw and clamp the work against the other jaw; a novel base member which is reversible end-for-end on the table, and a novel wet type grinder attachment.

Further objects will become apparent as the specification proceeds in conjunction with the annexed drawings, and from the appended claims.

In the drawings:

Figure 1 is a perspective view of the tool holding apparatus of the invention installed on a surface grinder, with one form of tool in operative position thereon;

Figure 2 is a front view of the apparatus shown in Figure 1, but illustrates the various swivel units disposed at right angles to simplify the disclosure, and shows the base rotated 180° from the position of Figure 1;

Figure 2A is a fragmental elevational view illustrating one of the nut assemblies in disassembled relationship;

Figure 5 is an exploded view of the parts of the tool holder of the invention;

Figure 6 is a perspective view illustrating the tool holder of the invention set up in proper position to grind a different type of tool from that shown in Figure 1, the tool being shown double size to show the surfaces more clearly;

Figure 7 is a top plan view of the tool shown in Figure 6;

Figure 8 is a side elevational view of the tool of Figure 7;

Figure 9 is an end view of the tool of Figures 7 and 8.

Figure 10 is a vertical sectional view of a grinding machine to which the vise of the invention is applied; and, Figure 11 is a fragmental sectional view taken substantially on the line 11—11 of Figure 10.

Figure 4:
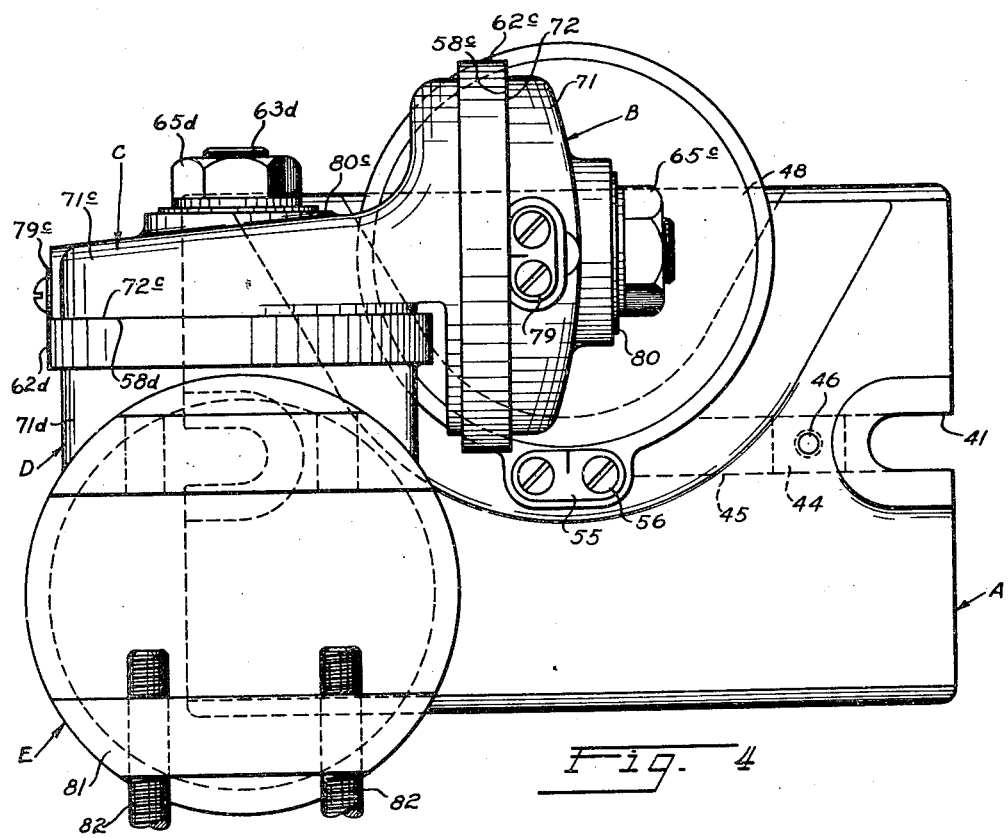
Figure 4 is a top plan view of the apparatus shown in Figures 2 and 3.

With continued reference to the drawings, wherein like reference characters have been employed to designate similar parts throughout the several views, and referring first to Figure 1, the tool holding apparatus of the invention has been illustrated as applied to a surface grinder having a base 11 and an upright column 12. Mounted for accurately guided sliding movement toward and away from the column on suitable ways (not shown) is a sub-table 13. A feed screw journalled in the base is threadedly connected to the sub-table and is rotated by means of a hand wheel 14. Mounted for accurately guided movement on the sub-table, at right angles to its path of travel, is a work table or slide 15, having a T-slot 16 therein. The work table is provided with a rack engaged by a pinion (not shown), and the pinion shaft is actuated by hand wheel 17. Travel of the work table is limited in both directions by means of a set screw 18 carried by a post 19 on the sub-table and cooperating with a pair of stop members 21 and 22 adjustably mounted on a rod 23 carried by the work table.

Mounted for vertical guided movement on column 12, and adapted to be adjusted up and down by a screw 24 carried by the top of the column, is a grinder head 25 having an arm 26 into which is threaded a micrometer screw assembly 27. Pivoted on head 25 is a frame 28 having an abutment 29 cooperating with the lower end of the micrometer screw. The abutment is adapted to be constantly urged upwardly into engagement with the screw by the weight of the motor (not shown). A grinding wheel 31, carried by an arbor journalled in frame 28, is shielded by a guard 32 pivoted for vertical swinging movement on a pin 33 carried by an ear 34 on frame 28. The guard is adapted to be locked in the position shown in Figure 1 by a thumb screw 35 cooperating with a slot in an ear 36 on the guard, and threaded into another ear on the grinder frame.

The structure so far described is the same as that disclosed in our co-pending application Serial No. 467,512, filed December 1, 1942, for "Machine tools," now Patent No. 2,386,283, dated October 9, 1945, which may be referred to for a further detailed disclosure.

We have found that by providing a base unit A, which may be clamped to the work table 15, and three interchangeable swivel units B, C and D of identical construction, and a vise or clamp unit E, adapted to firmly grip the tool, a tool holding apparatus is provided which is applicable to any conventional surface grinder to grind chip breaker grooves and the like; is so designed that any compound angle may be readily set up directly from the specifications of the various angles which define the grinding plane of the surface of the tool to be ground, and in which the setting of the parts may be carried out either with the apparatus in place on the grinder or on a bench or other convenient location; and one in which the entire unit may be rotated through 180° about a vertical axis on the base, to locate the work holder either side of the base, the work holder also being rotatable through 360° to properly position the tool; and through the provision of resilient pressure assemblies associated with the pivots of the swivel units, they may be adjusted during the setting operation to establish a constant resilient drag between the parts, permitting setting of the parts in the proper position without the necessity of simultaneously taking up on the nut when the set position has been achieved; and by providing adjustable zero plates cooperating with graduations on the swivel members the device may be accurately calibrated at the time of manufacture and also readily recalibrated should the necessity ever arise. By constructing the unit in the manner just described, a device is achieved which is extremely rugged; is readily adjusted by inexperienced workmen; will accurately hold its setting once the parts have been tightened; and will hold the tool with sufficient rigidity to prevent it from yielding in response to the forces set up during the grinding operation.

Figure 3:
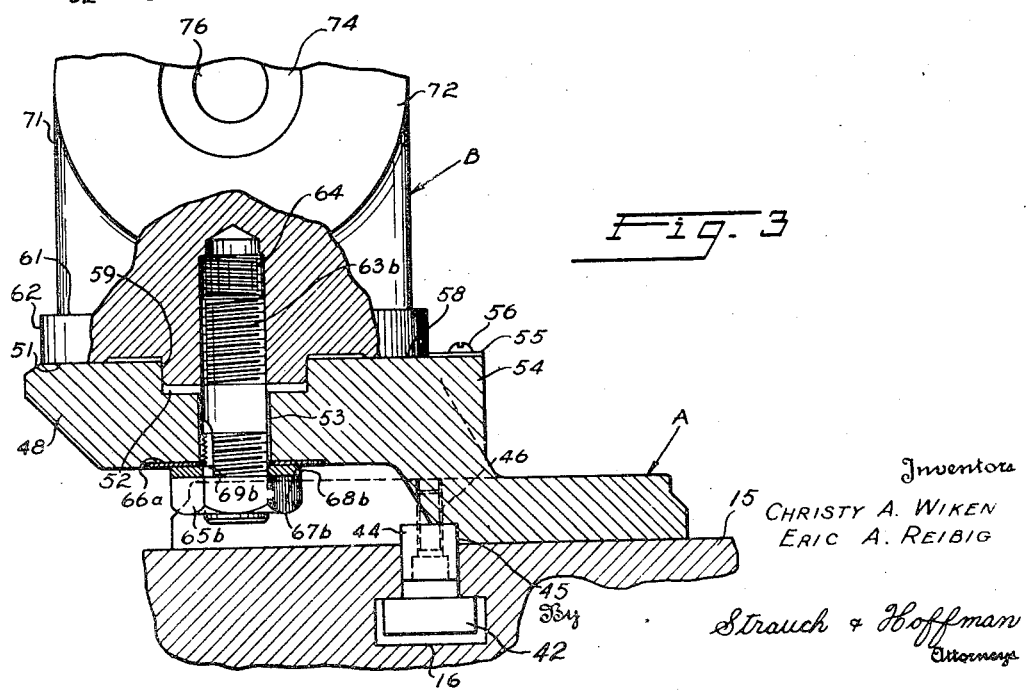
Figure 3 is a vertical sectional view through the base of the device shown in Figure 2, as viewed from the left-hand side of that figure.

Referring more particularly to Figures 2, 3 and 4, base member A is provided with a flat lower surface adapted to rest upon the upper surface of table 15, and at each end is provided with a recess 41. A pair of T-bolts 42, having their heads seating in T-slot 16 in the table, seat in recesses 41 of the base and have nuts 43 turned thereon, to firmly clamp the base to the table. The base member is accurately located on the table by means of a pair of keys 44 located at each end of the base adjacent recesses 41, and seating in a groove 45 on the underside of the base. They are locked in place by cap screws 46. Keys 44 snugly and slidably engage the upper portion of T-slot 16.

The base is also provided with an arched or raised portion 48, affording a recess into which a wrench may be inserted for adjusting the device while it is in place on the table, in a manner to be hereinafter pointed out. The arched portion of the base is provided with a flat, preferably annular clamping surface 51, accurately formed to lie exactly parallel to the lower surface of the base. At the center of the clamping face is a recess 52 having an accurately formed cylindrical piloting surface, and it communicates with an opening 53. The axes of the recess and opening are disposed exactly at right angles to clamping surface 51. The arched portion of the base is also provided with a boss 54 to which a zero plate 55 is detachably secured by a pair of screws 56, the openings being sufficiently large to permit adjustment of the plate over the face of the boss, for the purpose of calibrating the apparatus in a manner to be hereinafter pointed out.

Swivel unit or member B is mounted for adjustment through 360° on base A and has an annular clamping face or pressure pad 58 engaging clamping face 51 of the base, and a boss providing a cylindrical piloting surface 59 snugly cooperating with the piloting surface of recess 52. As seen in Figures 3 and 5, member B is provided with a cylindrical or disk-like base 61 having a cylindrical periphery 62 which is preferably graduated directly in degrees, the graduations cooperating with a zero mark or datum line on plate 55 of the base to indicate the adjusted position of the parts.

Unit B is adapted to be rigidly locked to base A by means of the novel pressure or securing unit that will now be described.

A stud 63b is secured in a tapped opening 64 in member B and projects through opening 53 in the base, concentrically with the axis of the piloting and clamping surfaces. Inasmuch as the pressure units are of identically the same construction, only one of them will be described in detail and the same reference characters, with the subscripts c, d, and e will be employed to designate those associated with units C, D and E, respectively. A nut 65b is threaded onto stud 63b, and interposed between it and a bearing face 66a of the base is a resilient washer 67b and a lock washer 68b, the latter having a finger 69b seating in a longitudinal keyway 70b in the stud. Referring more particularly to Figure 2A, wherein the pressure assembly for the units B and C is shown in disassembled relationship, it is observed that washer 67c is of bowed formation and it is made of resilient metal, whereby when the nut is partially taken up it will exert a resilient drag upon the clamping faces of the two units.

This is a highly desirable feature because the nuts may be partially taken up and the parts freely swiveled into their set position, and yet sufficient frictional drag is set up between their clamping faces so that they will stay in set position under the influence of the resilient washer until the nut is fully tightened, thereby obviating the necessity of holding the parts in adjusted position with one hand and manipulating the nut with the other to "hold" the adjustment. Setting of the parts is further facilitated by reason of the fact that washer 68b is locked to the stud by finger 69b. Accordingly, when the units are swiveled back and forth with respect to each other during adjusting, the lock washer and nut will move in unison with the stud, and there is accordingly no tendency to either loosen or tighten the nut on the stud. This insures maintenance of the resilient drag initially set up between the parts by the workman during the setting operation. Identical pressure units are provided between all of the other elements of the apparatus, thereby making it possible to set all of the units in the same manner.

Referring now to Figures 2 and 4, unit B is provided with a substantially diametrically disposed flat support or web-like portion 71 rising from base 61 and having a clamping face 72 disposed exactly at right angles to clamping face 58. By disposing web or support 71 substantially diametrically of its base 61, and allowing it to extend from side to side, or the full width of the base, and providing a large fillet 73 joining it to the base on the side opposite clamp face 72, an extremely rugged construction is provided. It will be noted that the distance from the plane of clamping face 72 to the axis of pressure pad 58 and the distance from the plane of pressure pad 58 to the axis of clamping face 72 and the corresponding distances on units C, D and E are small. As a consequence, the overhang of each clamping face with respect to the swivelling axis of its pressure pad and the overhang of the supported work with respect to base member A is reduced to a minimum thereby minimizing, in all adjusted positions of the apparatus, the tendency of units B to E to tilt on their axes and base member A to tilt on table 15 when normal operating stresses are imposed on the unit.

Unit B is also provided with a piloting recess 74 coacting with a pilot boss 59c of unit C, and communicating with an opening 76 coacting with stud 63c of unit C. By locating the axis of opening 76 as close to base 61 as the diameter of the base of unit C will permit, bending moments set up in the parts during operation are reduced to a minimum and a sturdy, compact rigid structure is provided.

Secured to a boss 77 at the top of member 71, by screws 78, is a scale plate 79 cooperating with the graduations of cylindrical face 62c of unit C, the parts being preferably so designed that the upper face of plate 79 lies exactly flush with the point of tangency of face 62c, so as to permit the respective marks to be brought into exact alignment.

From the structure so far described, it is apparent that, by loosening nut 65b, unit B may be rotated 360° about a vertical axis with respect to base A, and when the proper position has been reached, determined by bringing the selected graduation on cylindrical face 62 into alignment with the zero mark on scale plate 55, the parts may be rigidly locked together by tightening the nut. Since pilot face 59 snugly cooperates with pilot recess 52 of the base, accurate rotation about a vertical axis, independently of the fit of stud 63b in the base, is achieved, and by reason of the large area coacting clamping faces 51 and 58, the parts are held in extremely rigidly assembled relationship when nut 65b is tightened. The central pull exerted by the stud evenly distributes the pressure around the periphery of the base of unit B.

Unit C may be adjusted in similar manner about a horizontal axis by loosening nut 65c. The parts are rotatable through an angle of approximately 270°, the proper position being determined by bringing the correct graduation on cylindrical face 62c into alignment with the zero mark on scale plate 79.

Inasmuch as units C and D are of identically the same construction as unit B, the same reference characters, with the subscripts c and d, respectively, have been applied to corresponding parts and they will not be described in detail. As seen in Figures 2 and 4, unit C is disposed with its clamping face 58c disposed in clamping engagement with clamping face 72 of unit B, and is adapted to be rocked about a horizontal axis and locked in adjusted position by nut 65c.

Unit D is in turn secured to member C with clamping face 58d disposed in clamping engagement with clamping face 72c of member C, nut 65d pulling the washer assembly tightly against bearing face 80c. Unit D is accordingly mounted for rocking movement through 360° about an axis perpendicular to the axis of rocking movement of unit C, the graduations on base 62d cooperating with scale plate 79c to determine the proper adjusted position.

Unit E constitutes the vise or work clamp proper, and comprises a pair of clamp jaws 81 of identical construction and located equal distances from the longitudinal axis of the vise unit. Each jaw is provided with two tapped openings and a pair of clamp screws 82 are adapted to be threaded into either jaw, for clamping the work against the opposite jaw.

Unit E is secured to unit D in a manner similar to the other units and may be interchangeably mounted upon any of the various swivel members, including base A, should it be desired to mount the unit directly upon the base for a special operation not requiring the setting up of a compound angle. To this end, referring to Figure 2, unit E is provided with a flat clamping face 58e cooperating with clamping face 72d of unit D, and having a piloting boss 59e seating in piloting recess 74d of unit D. A stud 63e, secured to unit E, projects through opening 76d of unit D and is secured in place by a nut 65e.

The work holder or vise proper is accordingly adjustable through 360° about an axis perpendicular to the rocking axis of unit D, and may be brought into adjusted position by bringing the proper graduation on scale 62e into registry with the zero mark on plate 79d.

The novel tool holder of the invention accordingly comprises a base member adapted to be adjustably clamped on the work table of a conventional surface grinder; a vise unit or tool clamp proper, adapted to present the work to the wheel; and a plurality of intermediate support units or swivel members which provide a universally adjustable mount for the tool holder. By reason of the number of units employed, it is possible to set up any compound angle by adjusting the members individually to the components of the angle or to the individual angles locating the surface to be ground.

In Figure 1 we have shown a tool clamped in place on vise E, the parts being adjusted to grind a chip breaker on the tool in a direction substantially parallel to the axis of the tool shank, the table being reciprocated back and forth by handwheel 17, and the grinding wheel being lowered onto the work by adjusting screw 27.

As an example of the method of grinding a specific tool with the apparatus of the invention, we have illustrated in Figures 7, 8 and 9 a carbide tipped tool having a shank 91 and a head 92. The head is provided with a carbide tip 93 having a cutting edge 94 at the edge of a recess 95, the latter being known as a "chip breaker" groove.

In order to grind this tool, it is necessary for the wheel periphery to grind the surface designated 96 to a uniform depth and for the wheel and tool to move relatively to each other parallel to the wall designated 97, so that the wheel will take a cut the full width of surface 96 and successively widen wall 97.

As seen in Figure 8, the top of the tool head makes an angle of 6° with the top of the shank and is designated angle A. As seen in Figure 9, the top of the tool head also inclines 2° with respect to the tool shank and is designated angle B in this figure.

As seen in Figure 7, wall 97 is disposed at right angles with the top of tool head 92, but is inclined at an angle of 77° with respect to the longitudinal axis of the tool shank. This angle is designated angle C in Figure 7. In order to set this tool up for grinding, the first step is to bring the vise into a standard "starting" position with the parts mutually at right angles to each other. With the parts in the starting position, unit B is so rotated that the 90° graduation on cylindrical face 62 coincides with the reference mark on plate 55. The graduations increase in each direction to a right angle (0° to 90°) and they then decrease from 90° to 0° at the opposite side of the base, or 180° from the 0° mark shown. All of the other swivel units are similarly graduated. In other words the plane of the 90° marks of each of the various swivel units is parallel to the axis of the openings therein.

In order to complete the setting of the parts to the standard starting position, units E, D and C are each placed with their zero graduations on the reference lines or "zero" marks on their cooperating scale plates. The foregoing setting operations place the axis of the vise parallel to the direction of the table travel, it being observed that base 15 is clamped to the table with the arched portion disposed at the rear rather than at the front of the machine as illustrated in Figure 1. This is illustrative of the various ways in which the parts may be combined to carry out various grinding operations, and the particular relationship selected being dependent upon the character of the work being carried out. In this instance, the base is mounted on the table in the relationship shown because the tool to be ground has its chip breaker groove disposed generally transversely to the direction of table reciprocation and, by disposing the parts as shown, it is unnecessary to move sub-table 13 an excessive distance toward the operator to bring the tool into proper cooperation with the wheel.

With the parts disposed in the starting position just described, the tool is then placed in the vise (Figure 6) and securely clamped in place by screws 82.

Nut 65e is then loosened and the vise is rotated about its vertical axis in a direction to bring the head of the tool toward the wheel until the 90° graduation mark on scale 62e coincides with the zero mark on plate 79d. Nut 65e is then tightened to lock the parts together.

In order to set up the angle A (6°), nut 65d is loosened and unit D rotated in a direction to lower the head of the tool until the 6° graduation mark on scale 62d coincides with the zero mark on plate 79c. This dips the axis of the tool through an angle of 6°, as shown in Figure 6.

The next angle, angle B (2°) is now set up by loosening nut 65c and the unit turned clockwise (Figure 6) until the 2° graduation mark coincides with the zero mark on plate 79, and the nut tightened to lock the parts.

The foregoing operations bring surface 96 into exact parallelism with the top of the table, so that as the table is reciprocated generation of a surface exactly parallel to the original surface is assured.

The angle C (77°) is now set up by loosening nut 65b and rotating the entire unit clockwise (viewed from the top, Figure 6) to bring the 77° mark on scale 62 into registry with the zero mark on scale plate 55. This brings wall 97 of the chip breaker groove into parallelism with the side face of the wheel, so that it is only necessary (referring to Figure 1), to rotate handwheel 14 to bring wall 97 into alignment with the side face of the wheel. Micrometer 27 (and also screw 24 if necessary) is then manipulated to bring the wheel into grinding relationship with tool surface 96. Thereafter, by rotating handwheel 17, the table will be reciprocated to traverse the tool back and forth under the wheel, to accurately grind the chip breaker, it being understood that micrometer adjustment 27 is successively adjusted between the passages of the work to grind off the required amounts of the carbide tip to re-establish sharp edge 94.

It should be particularly observed that the novel assembly of units of the invention made it possible in the foregoing setting up operations to adjust the entire unit to the angle C without changing the plane of the first two angles previously set up. This is made possible by reason of the three adjustable units B, C, and D interposed between the base and the work holder. In the devices as heretofore proposed, it is impossible to directly set them up, from the specifications of the angles defining the plane of the surface to be ground, making it necessary to employ compensation tables and experienced labor to secure proper use of the work holding apparatus. With the present construction, it is possible to set up any tool, directly from the specification of the angles defining the plane of the surface to be ground, and the inclination of the bounding surface to the axis of the tool, or from a drawing showing these angles, without resort to compensation tables or the like. This makes it possible to insure proper setting up of the tools for grinding, even by inexperienced labor, and the procedure may be further simplified by stamping a number upon each plate 55, 79, 79c, and 79d as shown in Figure 6, and supplying the workman with a list of the settings for the various tool angles, and which will enable him to completely and rapidly set up the apparatus for grinding any type tool.

If it ever becomes necessary to re-calibrate the swivel units, this may be readily carried out by loosening the screws holding the various plates 55, 79, 79c and 79d and adjusting the plates into the proper position (permitted by the enlarged screw openings in the plates) and the screws tightened to lock them in place.

From the foregoing detailed disclosure, it is apparent that the invention provides a novel work holding assembly which may be quickly applied to the table of a surface grinder to convert it into a chip breaker or like grinder; is so designed that any tool may be readily set up for grinding directly from the specification of the angles defining the surface to be ground, no matter what compound angles may be involved; holds the tool with sufficient rigidity to prevent it from yielding in response to the forces set up during grinding; and is of simple, low cost design and yet is of extremely rugged construction.

While we have disclosed the work-holding device of the invention as being applied to a surface grinder, it is to be understood that it may also be applied to the tables of other machines, such as millers, planers, drill presses and the like for presenting work pieces to various types of cutters, without departing from the spirit of the invention.

For instance the following are a few of the uses to which the novel vise of the invention has been applied:

(1) Base member A may be clamped directly to the bed or table of a milling machine and the vise employed to hold a tool or any other work piece at the proper angle for milling, the ability of setting up any compound angle rendering the device extremely useful, enabling all kinds of work to be readily handled.

(2) The base member may be mounted flat on the table of a drill press (key 44 being removed) and the drilling at compound angles carried out.

(3) The base member may be mounted on a milling machine table and a milling operation carried out, and then, without changing the adjustment of any of the vise components, transferred bodily with the work piece to a drill press and drilling carried out at the same angle, thereby obviating the need to again "set up" the angle.

(4) The base member may be mounted flat on a surface plate (with keys 44 removed) and the vise employed to hold work pieces for layout or inspection purposes. The device accordingly provides a layout or inspection fixture which will accurately hold a work piece at any desired angle to the surface plate.

It is also to be understood that vise unit E may if desired be replaced by other types of work holding means. For instance a permanent magnetic chuck may be built into unit E, and adjusted in member D in the same manner as the unit E illustrated. When a magnetic chuck is employed it preferably has a flat seating surface adjacent the tops of the magnetic poles and a straight holding ledge along one side against which the work will rest, the ledge preferably extending exactly parallel to a plane passing through the zero-zero graduations of dial 62e, to facilitate setting up the angles.

In Figures 10 and 11 we have shown the vise of the invention applied to a grinding machine particularly designed for lapping in flat surfaces, the major difference from the previously described form of apparatus residing in the use of a cup wheel and a special slide assembly for supporting the vise and feeding it toward the wheel and for also traversing it across the wheel face.

With continued reference to Figures 10 and 11, a cup wheel 101, having a diamond cutting face 102, is mounted on an arbor journalled in a grinder frame 103 and driven by a directly coupled electric motor in well known manner (not shown). A pot 104 supported on the grinder frame delivers coolant through a tube 105 to the inner surface of the wheel, from which it is centrifugally fed ove the cutting face during grinding.

Secured to a downwardly directed clamping face 106 on the grinder frame, by means of a plurality of studs 107 and nuts 108, is a spacer element 109 and a coolant drip pan 110, the latter being disposed in frictional engagement along a mating plane 111. The studs extend through slots 112 in a boss 113 in the pan, which are disposed parallel to the vertical plane of the grinder axis, so that by loosening nuts 108 the pan may be moved toward and away from the wheel face, for carrying out coarse adjustments of the vise with respect to the wheel.

Mounted on suitable supports 114 and 115 in the pan is a guide 116 having a flat upper surface. Slidable on guide 116, and guided for movement parallel to the wheel face by means of a rack bar 117 riding in a longitudinal groove in the upper face of support 116, is a table or slide 118. The rack bar is secured in a groove in the slide. The latter is adapted to be reciprocated past the wheel by a pinion 119 engaging rack bar 117 and carried by a shaft 121 journalled in front support 115 and a boss 122 provided on the front wall of the pan. Shaft 121 is restrained against endwise movement by collars 123 and 124, and is actuated by a hand wheel 125.

Guided for movement on slide 118 at right angles to rack bar 117, by means of dovetail projections 126 seating in correspondingly shaped ways 127 is a base or second slide 128. Journalled in the front of slide 128, and threaded into one of the dovetail portions 126 of slide 118, is a screw 129, which is restrained against endwise movement by a collar 131, and is adapted to be actuated by a knurled knob 132.

Referring to Figure 11, slide 128 is provided with a clamping face 133 on its upper face, and a recess 134 on its lower face.

Swivel unit B is secured directly to clamping face 133, nut 65b being located in recess 134 and being reached for adjustment by manipulating knob 132, a zero or datum line being provided on a plate 135. Swivel units C, D and E are carried by unit B and are adjusted to properly position the carbide tip 136 of tool 137 for grinding in a manner similar to that previously described, it being understood that the angles may be set up directly from the specifications of the tool being ground.

When the tool has been properly adjusted, knob 132 is rotated to move slide 128 and the vise assembly toward the wheel the proper distance to take the required initial cut. Handwheel 125 is then rotated to carry the vise and slide assembly past the wheel. If a second pass is required to re-establish the cutting edge, knob 132 may be adjusted to move the vise assembly further toward the wheel, it being understood that coarse adjustments in setting up are carried out by loosening nuts 108 and moving the pan and assembly bodily toward or away from the wheel.

Heretofore simple surfaces have been ground on grinders of this general character by employing a tilting table and a miter gauge, the tool being fed by hand against the wheel, but it was difficult to set up for grinding; the tool would often slip and chip the expensive diamond wheel and the quality of grinding left much to be desired. The present structure avoids all these difficulties and also makes it possible to directly set up the tool for grinding all angles, no matter how complex and by keeping a record of the various dial settings any set up may be rapidly duplicated.

Inasmuch as the grinding wheel; grinder frame 103 and pot 104 are parts of a standard grinder, the novel pan and slide assembly of the invention may be readily installed as an attachment in existing grinders by removing the standard pan; installing the long studs 107 and spacer 109; and clamping the new pan assembly in place by nuts 108.

Although we have provided T-bolts 42 for anchoring the unit to the grinding machine table, it is to be understood that if the latter is provided with a magnetic chuck it is merely necessary to remove keys 44 and allow the base to seat flat on the chuck and the T-bolts dispensed with, the base being lined up parallel with the direction of table travel by means of a reference line on the chuck.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a grinding apparatus having a grinding wheel and a flat table reciprocable below said wheel; a work holder comprising a base member having means for detachably clamping it to said table, a first swivel unit mounted for angular adjustment about a vertical axis on said base member and comprising a substantially disk-like base having an annular clamping face on one side and a substantially diametrically disposed web projecting from the other side at right angles to said annular clamping face, said web having a clamping face on one side thereof disposed at right angles to said annular clamping face and adapted to cooperate in surface engagement with the annular clamping face of another swivelling unit; a second swivel unit, identical to said first swivel unit, and mounted for angular adjustment about a horizontal axis on said first swivel unit; a third swivel unit, identical to said first swivel unit, mounted on said second swivel unit for angular adjustment about an axis disposed at right angles to the axis of adjustment between said first and second swivel units; and a swivelling vise unit mounted on said third swivel unit for angular adjustment about an axis disposed at right angles to the axis of angular adjustment between said second and third swivel units and embodying means for detachably gripping and holding a work piece; and means for rigidly locking said vise and swivel units against angular movement with respect to said base member and to each other.

2. A grinder table work supporting apparatus comprising a base member having means for securing it to said table and means for supporting a swivel unit thereon; a work holding unit adapted to support a work piece in cooperative relation to a grinding wheel and having means to swivellingly support it on a swivel unit; and a plurality of pivotally interconnected swivel units supporting said work holding unit upon said base member and having mating clamping faces and fastening elements, at least one of said units comprising a disc-like base having on one side an annular clamping face and a fastening element projecting away from said base at the center of said annular face and disposed at right angles thereto and on its other side a web-like support projecting away from said other side at right angles to said annular clamping face and extending from side to side of and substantially bisecting said base and providing a second clamping face of substantially the same diameter as said first clamping face; an opening in said web-like support disposed parallel to said first clamping face and normal to said second clamping face and being slightly larger than said fastening element, whereby said web-like support may receive the fastening element of a mating unit and be secured with the clamping face of the web-like support in engagement with the clamping face of its mating unit; and means cooperating with said fastening elements for rigidly clamping said units to each other and to said base member.

3. The apparatus defined in claim 2 wherein said base member is provided with a horizontally disposed, upwardly facing annular face cooperating in surface engagement with a clamping face of one of said swivel units.

4. The apparatus defined in claim 2, wherein said work holding unit is provided with an annular clamping face cooperating in surface engagement with a clamping face of one of said swivel units.

5. The apparatus defined in claim 2, wherein said work holding unit and the base of each swivel unit is provided with a cylindrical peripheral face having graduations thereon, and said swivel units and said base member are provided with indicia cooperating with the graduations on said cylindrical faces, to accurately locate said work holding unit and said swivel units in predetermined angular relationship to each other and to said base member.

6. In a work holding device for a metal working machine, a pair of members adapted to be rigidly secured together in predetermined angular relationship, each member having a disc-like base; an annular clamping face on one side of said base and a flat supporting web projecting from the other side of said base substantially at right angles to said clamping face and disposed substantially diametrically with respect to said base and extending substantially to the periphery of said base; a second annular clamping face on one side of said web, disposed normal to said first clamping face; a bearing face on the opposite side of said web disposed parallel to said second clamping face; a cylindrical piloting boss projecting from the center of said first clamping face and having an axis disposed normal to the latter; a cylindrical piloting recess in said web at the center of said second clamping face and having its axis disposed normal to the latter, said piloting boss and recess being of substantially the same diameter, so as to snugly fit one within the other, and said web also having an opening concentric with said piloting recess and said base having a threaded securing element, of a slightly smaller diameter than said opening and concentric with said piloting boss and projecting away from said first clamping face, said members being disposed with the first clamping face and the piloting boss of one member engaged with the second clamping face and the piloting recess of the other member, and with the fastening element of said one member projecting through the opening in the other member; and a pressure assembly threaded on the fastening element of said one member and engaging the bearing face of said other member.

7. The work holding device defined in claim 6, together with a work holding vise having a clamping face seating against the second clamping face of said one member; a cylindrical piloting boss seating in the piloting recess of said one member; a fastening element extending through the opening in the web of said one member; and means threaded on said fastening element and engaging said bearing face of said one member.

8. The work holding device defined in claim 6, wherein said fastening element is provided with a longitudinally extending guide and said pressure means comprises a nut threaded on said fastening element and washer means disposed between said nut and the bearing face of the other of said member and comprising a resilient washer and a plain washer having means cooperating with said guide to lock it against rotation with respect to said fastening element, said resilient washer being resilient in an axial direction and operable to set up a frictional force of predetermined magnitude between the engaged clamping faces when said nut is partially tightened.

9. In a work holding device, a swivel member comprising a cylindrical base of short axial length; an annular clamping face and an inwardly and concentrically disposed piloting boss on one side of said base, said clamping face extending outwardly substantially to the periphery of said base; a flat support projecting from the other side of said base substantially at right angles to said clamping face and having a clamping face on one side and a bearing face on the other, disposed parallel to each other and normal to said first clamping face, said support being disposed substantially along a diameter of said base and having a width adjacent its junction with said base substantially equal to the diameter of said base and a cylindrical piloting recess and concentric cylindrical opening within said recess, the axis of said opening and said recess being spaced from said base a distance slightly greater than the radius of said base.

10. In a work supporting vise, a plurality of pivotally interconnected swivel units each of which has a pair of clamping faces provided respectively with coaxial piloting boss and recess elements of substantially the same diameter adapted to snugly fit one within the other and a coaxial fastening element secured in and projecting away at right angles from one of said pair of clamping faces, each of said clamping faces constituting an annular, clamping surface at right angles to the axis of its associated fastening and piloting elements.

CHRISTY A. WIKEN.
ERIC A. REIBIG.

REFERENCES CITED

The following references are of record in the file of this patent:

UNITED STATES PATENTS

| Number | Name | Date |
|---|---|---|
| 439,154 | Holz | Oct. 28, 1890 |
| 467,857 | Conradson | Jan. 26, 1892 |
| 504,000 | Thiel et al. | Aug. 29, 1893 |
| 809,432 | Darrschmidt | Jan. 9, 1906 |
| 1,092,867 | Sellew | Apr. 14, 1914 |
| 1,377,884 | Heryngfel | May 10, 1921 |
| 1,392,130 | Engstrom et al. | Sept. 27, 1921 |
| 1,414,970 | Nelson | May 2, 1922 |
| 1,677,889 | Gairing | July 24, 1928 |
| 1,889,248 | Kilmer | Nov. 29, 1932 |
| 1,703,017 | Singer | Feb. 19, 1929 |

FOREIGN PATENTS

| Number | Country | Date |
|---|---|---|
| 126,819 | Great Britain | May 22, 1919 |